US005813104A

United States Patent [19]

Quick

[11] Patent Number: 5,813,104

[45] Date of Patent: Sep. 29, 1998

[54] SUCKER ROD THREAD PROTECTOR REMOVAL TOOL

[76] Inventor: Thomas W. Quick, 2513 SW. 93rd St., Oklahoma City, Okla. 73159

[21] Appl. No.: 774,099

[22] Filed: Dec. 24, 1996

[51] Int. Cl.[6] .................... B23P 19/02

[52] U.S. Cl. .................... 29/235; 29/261

[58] Field of Search .................... 29/235, 263, 265, 29/268, 261

[56] References Cited

U.S. PATENT DOCUMENTS

| | | | |
|---|---|---|---|
| 1,873,322 | 8/1932 | Elder | 29/261 |
| 2,003,756 | 6/1935 | Nagel | 29/261 |
| 3,337,943 | 8/1967 | Powell | 29/261 |
| 3,571,885 | 3/1971 | McGrath | 29/235 |
| 4,807,343 | 2/1989 | Wadsworth | 29/235 |
| 5,406,685 | 4/1995 | Harmand | 29/235 |
| 5,479,688 | 1/1996 | Rubino et al. | 29/261 |

*Primary Examiner*—Robert C. Watson
*Attorney, Agent, or Firm*—Robert K. Rhea

[57] ABSTRACT

A frusto-conical thread protector on the pin end portion of a sucker rod is removed by a cylindrical housing axially surrounding, at one end portion, the thread protector and the adjacent end portion of the sucker rod. Stop means diametrically mounted on the periphery of the tubular housing at the sucker rod end portion projects inwardly of the housing wall in confronting relation to abut the large diameter open end of the thread protector for removing the thread protector from the sucker rod in response to a plunger axially projecting into the housing opposite the sucker rod and forcibly moved longitudinally to pierce the wall at the small end of the thread protector and axially abut the adjacent end of the sucker rod and separate the thread protector from the sucker rod.

6 Claims, 2 Drawing Sheets

SUCKER ROD THREAD PROTECTOR REMOVAL TOOL

BACKGROUND OF THE INVENTION

This invention relates to oil well sucker rod thread protectors and more particularly to a tool for removing the protector.

In order to protect the threads on the pin end of a sucker rod prior to use it is common practice to cover the threads with a hard plastic cap which is axially forced over the pin end of a sucker rod. The tips of the V-threads of the sucker rod pin are embedded in the internal ribs of the protector and it is normally manually unscrewed from the threads of the sucker rod before use of the latter. This is a labor intensive time consuming job.

This invention provides a manually operated tool which minimizes the time and effort required for removing thread protectors from sucker rods.

BRIEF SUMMARY OF THE INVENTION

A tubular housing dimensioned to axially loosely surround a sucker rod pin is provided with a partition intermediate its ends which defines an open end socket at one end for axially surrounding the pin end of a sucker rod and a defining a cap closed socket at its opposite end.

A pair of substantially L-shaped stops are pivotally secured intermediate the ends of the leg portions to diametrically opposite sides of the tubular member in longitudinal aligned relation and with the foot portions of the L-shape stops disposed toward the socket open end. Resilient means interposed between the legs of the L-shaped stops and the periphery of the tubular member bias the end portions of the legs toward and away from the periphery of the housing and bias the foot portions of the stops toward each other in confronting relation to define a dimension between the confronting ends of the stops of smaller diameter than the outside diameter of a thread protector to be removed from the sucker rod pin end.

A plunger projects axially through the socket cap and partition from the closed end of the tubular member and is forced through the small diameter closed end of a frusto-conical thread protector on the sucker rod pin end to axially abut the pin end of the sucker rod.

In one embodiment the pivoting lever member engages notches or serrations on the plunger to move the plunger toward the sucker rod and move the tubular member and stops relative to the sucker rod in a thread protector removing action.

In a second embodiment the plunger is threadedly received by the closed socket end cap and is angularly rotated for axially moving the plunger toward the pin end of the sucker rod. In both embodiments a helical spring axially surrounds the plunger adjacent the side of the partition side facing the sucker rod end for ejecting the thread protector from the tubular member after removing the thread protector from the sucker rod pin.

The principal object of this invention is to provide a manually operated tubular tool axially surrounding a thread protector on a sucker rod pin and having grips diametrically abutting the open end rim of a thread protector while power means axially forces a plunger into engagement with the adjacent end of the sucker rod pin to forceably remove the thread protector from the sucker rod threads.

DESCRIPTION OF THE PREFERRED EMBODIMENTS

Figure 1:
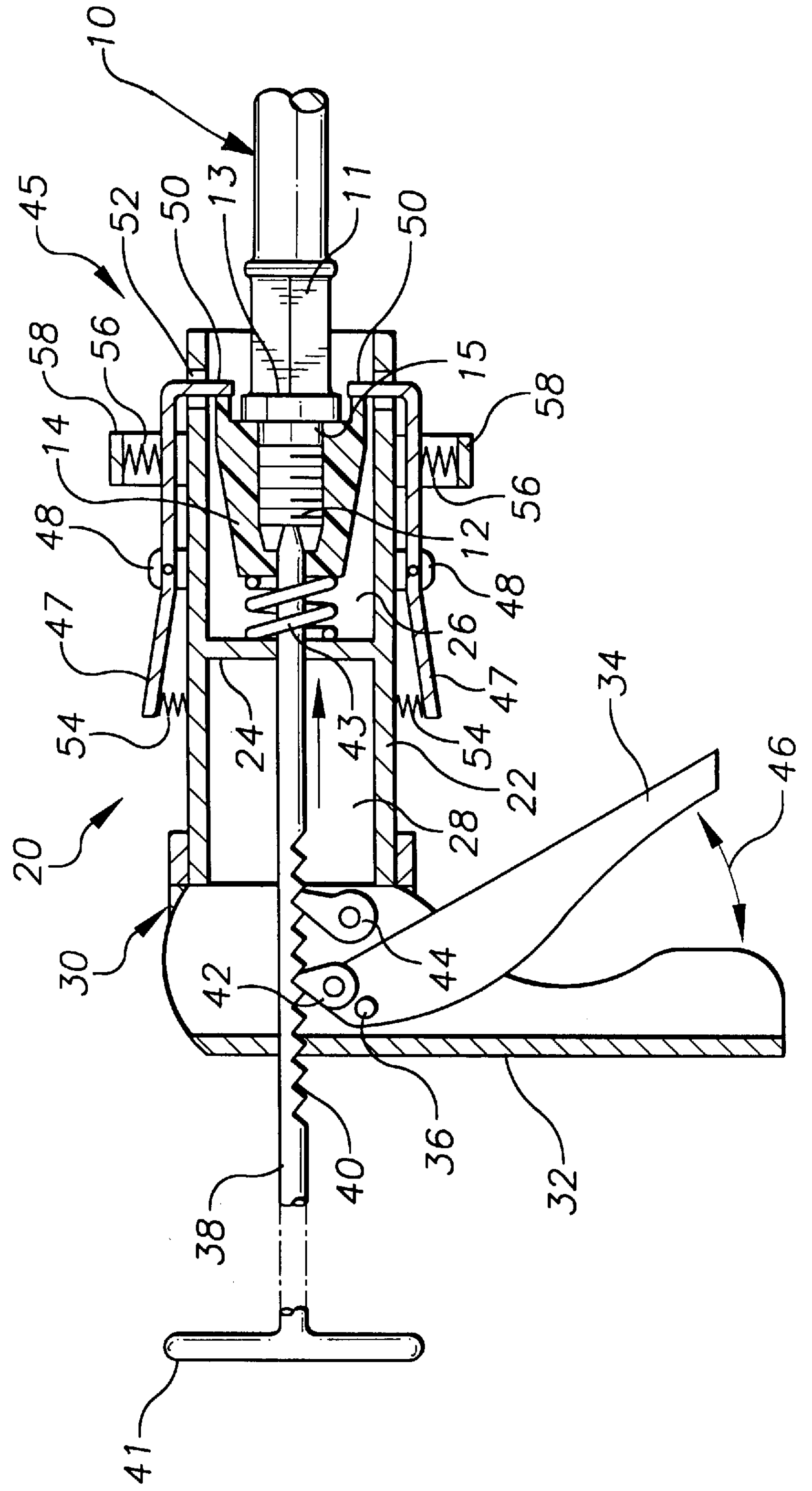
FIG. 1 is a longitudinal cross sectional view of one embodiment of the tool in operative position; and, FIG. 2 is a similar longitudinal cross sectional view of an alternative embodiment of the tool.

Like characters of reference designate like parts in those figures of the drawings in which they occur.

In the drawings:

The reference numeral 10 indicates the pin end of a an oil field sucker rod having wrench flats 11 and external threads 12 separated by an annular flange 13 which abuts the box end, not shown, of a sucker rod when the two are axially joined. The reference numeral 14 indicates a thread protector of frusto-conical configuration having a closed end socket which snugly receives the sucker rod threads 12 and defines, at its open end, a bell 15 diametrically loosely surrounding the sucker rod flange 13.

The above description forms no part of the present invention and is set forth to show the combination with which the present invention is used.

Referring first to FIG. 1 the reference number 20 indicates one embodiment of the tool as a whole comprising an elongated tubular housing 22 having an inside diameter loosely surrounding the outside diameter of the thread protector 14 when one end of the housing is axially disposed over the pin end of the sucker rod. A partition 24 divides the housing 22 intermediate its ends to form an open end socket 26 loosely surrounding the thread protector 14 and an opposite socket 28 closed at its end opposite the partition 24 by a handle means 30. The handle means 30 comprises a fixed handle 32 protecting laterally of the axis of the tubular housing and having a pivoting lever 34 secured at one end portion to the fixed handle, as at 36. The partition 24 and fixed handle 32 are line drilled for slidably receiving an elongated plunger 38 having a T-handle 41 and a longitudinal series of serrations 40 in a portion of its periphery. A spring urged pawl 42 pivotally supported by the lever 34 and engaging the serrations 40 forces the plunger 38 forwardly toward the sucker rod when the free end portion of the lever is reciprocated in the direction of the arrow 46. A spring urged detent 44 pivotally mounted on the handle portion 32 successively engages the serrations 40 to preclude rearward movement of the plunger. A helical thread protector ejection spring 43 axially surrounds the plunger 38 adjacent the partition 24 and projects toward the sucker rod to bias a removed thread protector toward the open end of the housing socket 26.

Stop means 45 comprising a pair of L-shaped members having their leg portions 47 longitudinally aligned with the housing 22 are pivotally connected thereto between pairs of outstanding ears 48 for vertical pivoting movement of their respective end portions toward and away from the housing perimeter in diametric opposition. The foot portions 50 of the stop means project inwardly in confronting relation toward each other through a pair of slots 52 oppositely formed in the housing wall adjacent the open end of the socket 26. A pair of springs 54 interposed between the housing perimeter and the end portions of the respective stop means leg 47 bias the foot portions 50 of the stop members 45 inwardly of the housing to abut an intermediate portion of the end surface defining the open end of the thread protector 14, for the reasons presently explained. Similarly a second pair of spring means 56 is interposed between the outwardly disposed surface of the forward end portion of the respective stop member leg 47 and the bight portion 58 of a pair of U-shaped members bridging the respective leg 47 of the stop members and secured to the perimeter of the housing 22 in diametric opposition.

Figure 2:
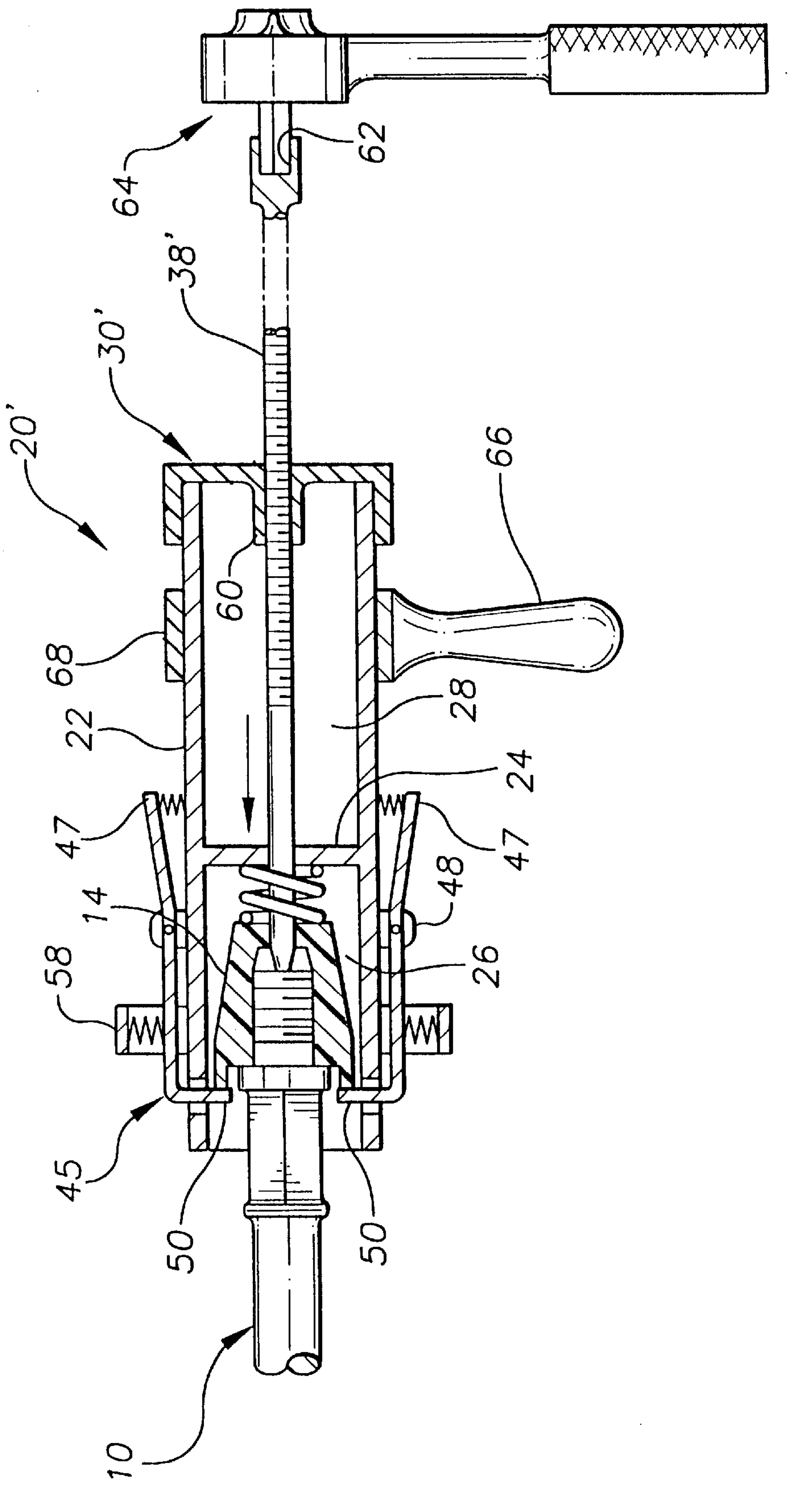

Referring also to FIG. 2 where like parts have identical reference numerals and modified parts bear prime numerals, the reference numeral 20' similarly indicates a thread protector removing tool having a housing socket closed end cap means 30' provided with an axial internally threaded boss 60 which cooperatively receives external threads on a plunger 38'. The end of the plunger 38' opposite the sucker rod is provided with a square socket 62 for cooperation with a ratchet wrench drive 64 for rotating the plunger 38', as presently disclosed. In this embodiment a rigid handle 66 is secured to the housing by a band 68 adjacent the cap 30'.

OPERATION

In operation of the embodiment shown by FIG. 1, the housing 22 is installed over the thread protector on sucker rod pin end by manually depressing the rearward end portions of the legs 47 toward the surface of the housing 22 to at least partially withdraw the stop means foot portions 50 from the slots 52 to allow the confronting ends of the foot portions 50 to pass over the periphery of the thread protector 14. Simultaneously with this action the thread protector ejection spring 43 is partially compressed by the small end closed wall portion of the thread protector 14. Releasing the leg portions 47 allows the pairs of springs 54 and 56 to bias the stop foot members 50 toward each other and overlap at their inward end portions, a peripheral portion of the end wall surface of the larger end of the thread protector 14. While holding the device 20, by the handle 32, in the position illustrated by FIG. 1 the operator manually moves the lever member 34 of the handle rearwardly engaging the pawl 42 with one of the serrations 40 and forces the plunger 38 toward the rearward or small end of the thread protector. The detent 44 maintains the plunger 38 in its forwardly disposed position while the lever handle 34 is biased forwardly for the pawl 42 to engage a next rearward serration 40. This action is repeated until the forward tapered end of the plunger punctures the rearward end of the thread protector and abuts the adjacent threaded end of the sucker rod. Continued action of the handle members forcing the plunger 38 forwardly moves the forward end portion of the housing rearwardly relative to the sucker rod end and the foot members 50 engaging end edge surfaces of the thread protector manually move it relative to the sucker rod threads 12 and releases the thread protector from the sucker rod pin end portion. The tool 20 is removed from the sucker rod 10 and the thread protector 14 is removed from the housing socket 26 by the spring 43 assisting the operator in its removal. The cross bar 41 on the plunger 38 is angularly rotated 180 degrees in either direction to disengage the serrations 40 from the pawl 42 and detent 44 and manually withdrawing the plunger for a subsequent thread protector removal.

In the operation of the embodiment 20' illustrated by FIG. 2 the thread protector 14 is similarly installed on the sucker rod pin end portion and the stop means 45 is similarly engaged with the forward end of the thread protector. In this embodiment the housing 22 is maintained in axial alignment with the sucker rod 10 by a handle 66 while the operator using the rachet wrench 64 angularly rotates the plunger 38' in a thread tightening direction which progressively moves the forward end of the plunger 38' to contact the rearward closed end of the thread protector 14 similarly piercing its closed end and axially abutting the end of the sucker rod 10 to remove the thread protector from the sucker rod as described hereinabove for the first embodiment.

After removing the thread protector from the tool 20' the plunger 38' is angularly rotated in the opposite direction to retract its forward end toward the partition 24 for a subsequent removal of additional thread protectors from other sucker rod pin end portions, not shown.

Obviously the invention is susceptible to changes or alterations without defeating its practicability. Therefore, I do not wish to be confined to the preferred embodiment shown in the drawings and described herein.

I claim:

1. A tool for removing a frusto-conical thread protector, having its smaller end closed, from the pin end of an oil well sucker rod, comprising:

a tubular housing having diametrically opposite slots adjacent one end and having a partition intermediate its ends forming an open end socket axially surrounding the sucker rod pin end and the thread protector;

a pair of L-shaped stops having leg portions longitudinally secured in diametric opposition to the periphery of said housing open end socket for longitudinal pivoting movement of the respective end portion of each stop leg portion of said pair of stops toward and away from the periphery of the housing, each stop of said pair of stops having a foot portion normally orthogonally projecting inwardly through said slots in confronting relation for abutting the adjacent end surface of said thread protector;

spring means at respective end portions of said leg portions for biasing said foot portions toward each other;

a plunger axially projecting into said housing through the partition from its end opposite said sucker rod;

a helical spring axially interposed between the partition and the adjacent end of the thread protector; and, manually actuated handle means acting on said plunger for forceably moving said plunger axially relative to the housing and thread protector into axial abutting relation with said sucker rod and separating said thread protector from the sucker rod.

2. The tool according to claim 1 in which said plunger is provided with a longitudinal row of serrations and said handle means includes:

a handle orthogonally connected rigidly with said housing opposite the sucker rod;

a pawl on the rigid handle operatively contacting the serrations;

a lever handle pivotally secured at one end portion to the rigid handle for pivoting movement at its other end portion toward and away from the rigid handle; and, a detent on the lever handle for moving said plunger toward the sucker rod when said lever handle is moved toward the rigid handle.

3. The tool according to claim 1 in which the handle means further includes:

screw threads on the periphery of said plunger, said plunger having a wrench socket on its end opposite the sucker rod; and, a ratchet wrench attached to the plunger socket.

4. A tool for removing a frusto-conical thread protector, having its smaller end closed, from the pin end of an oil well sucker rod, comprising:

a tubular housing having having a partition intermediate its ends forming an open end socket axially surrounding the sucker rod pin end and the thread protector;

L-shaped stop means having leg portions pivotally secured in diametric opposition to the periphery of said housing open end socket and spring biased at one end portion toward said housing, each stop of said stop means having a foot portion at said one end portion orthogonally projecting inwardly in confronting relation from the wall of the housing open end socket for abutting the adjacent end surface of said thread protector;

a plunger axially projecting into said housing through the partition from its end opposite said sucker rod;

a helical spring axially interposed between the partition and the adjacent end of the thread protector; and, manually actuated handle means associated with said plunger for forceably moving said plunger axially, relative to the housing and thread protector, to abut said sucker rod and separate said thread protector from the sucker rod.

5. The tool according to claim 4 in which said plunger is provided with a longitudinal row of serrations and said handle means includes:

a handle orthogonally rigidly connected with said housing opposite the sucker rod;

a detent on the rigid handle operatively contacting the serrations;

a lever handle pivotally secured at one end portion to the rigid handle for pivoting movement at its other end portion toward and away from the rigid handle; and, a pawl on the lever handle for moving said plunger toward the sucker rod when said lever handle is moved toward the rigid handle.

6. The tool according to claim 4 in which the handle means further includes:

screw threads on the periphery of said plunger, said plunger having a wrench socket at its end opposite the sucker rod; and, a ratchet wrench operatively attached to the plunger socket.

* * * * *